United States Patent
Ying et al.

(10) Patent No.: US 7,277,577 B2
(45) Date of Patent: Oct. 2, 2007

(54) METHOD AND SYSTEM FOR DETECTING THREAT OBJECTS USING COMPUTED TOMOGRAPHY IMAGES

(75) Inventors: Zhengrong Ying, Wakefield, MA (US); Sergey Simanovsky, Brookline, MA (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 723 days.

(21) Appl. No.: 10/831,909

(22) Filed: Apr. 26, 2004

(65) Prior Publication Data

US 2005/0238232 A1    Oct. 27, 2005

(51) Int. Cl.
*G06K 9/00*    (2006.01)

(52) U.S. Cl. ..................................... 382/168

(58) Field of Classification Search .......... 382/100, 382/131, 154; 378/4, 5, 8, 57, 87, 901; 250/363.04
See application file for complete search history.

(56) References Cited

U.S. PATENT DOCUMENTS

| | | | |
|---|---|---|---|
| 5,182,764 A | 1/1993 | Peschmann et al. | |
| 5,367,552 A | 11/1994 | Peschmann et al. | |
| 5,473,657 A | 12/1995 | McKenna | |
| 5,661,774 A | 8/1997 | Gordon et al. | |
| 5,802,134 A | 9/1998 | Larson et al. | |
| 5,881,122 A | 3/1999 | Ruth et al. | |
| 5,887,047 A | 3/1999 | Ruth et al. | |
| 5,901,198 A | 5/1999 | Ruth et al. | |
| 5,909,477 A | 6/1999 | Ruth et al. | |
| 5,932,874 A | 8/1999 | Legg et al. | |
| 5,937,028 A | 8/1999 | Tybinkowski et al. | |
| 5,949,842 A | 9/1999 | Schafer et al. | |
| 5,970,113 A | 10/1999 | Ruth et al. | |
| 5,982,843 A | 11/1999 | Bailey et al. | |
| 5,982,844 A | 11/1999 | Tybinkowski et al. | |
| 6,026,143 A | 2/2000 | Simanovsky et al. | |
| 6,026,171 A | 2/2000 | Hiraoglu et al. | |
| 6,035,014 A | 3/2000 | Hiraoglu et al. | |
| 6,067,366 A | 5/2000 | Simanovsky et al. | |
| 6,075,871 A | 6/2000 | Simanovsky et al. | |
| 6,076,400 A | 6/2000 | Bechwati et al. | |
| 6,078,642 A | 6/2000 | Simanovsky et al. | |
| 6,091,795 A | 7/2000 | Schafer et al. | |
| 6,108,396 A | 8/2000 | Bechwati et al. | |
| 6,111,974 A | 8/2000 | Hiraoglu et al. | |
| 6,128,365 A | 10/2000 | Bechwati et al. | |
| 6,256,404 B1 | 7/2001 | Gordon et al. | |
| 6,272,230 B1 | 8/2001 | Hiraoglu et al. | |
| 6,345,113 B1 | 2/2002 | Crawford et al. | |

*Primary Examiner*—Jose L. Couso
(74) *Attorney, Agent, or Firm*—McDermott Will & Emery LLP (57) ABSTRACT

A method of and system for detecting threat objects represented in 3D CT data uses knowledge of one or more predefined shapes of the threat objects. An object represented by CT data for a region is identified. A two-dimensional projection of the object along a principal axis of the object is generated. A contour of the object boundary in the projection image is computed. A shape histogram is computed from the extracted contour. A difference measure between the extracted shape histogram and a set of pre-computed threat shape histograms is computed. A declaration of a threat object is made if the difference measure is less than a pre-defined threshold.

17 Claims, 7 Drawing Sheets

METHOD AND SYSTEM FOR DETECTING THREAT OBJECTS USING COMPUTED TOMOGRAPHY IMAGES

RELATED APPLICATIONS

This patent application and/or patents is related to the following co-pending U.S. applications, of the same assignee as the present application, the contents of which are incorporated herein in their entirety by reference:

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997;

"Area Detector Array for Computed Tomography Scanning System," invented by David A Schafer, et al., U.S. application Ser. No. 08/948,450, filed on Oct. 10, 1997;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued Nov. 9, 1999;

"Measurement and Control System for Controlling System Functions as a Function of Rotational Parameters of a Rotating Device," invented by Geoffrey A. Legg, et al., U.S. application Ser. No. 08,948,493, filed on Oct. 10, 1997, now U.S. Pat. No. 5,932,874;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. appliation Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,025,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000.

FIELD OF THE DISCLOSURE

The present disclosure relates generally to computed tomography (CT) scanners, and more specifically to a method of and system for detecting threat objects in carry-on/in luggage utilizing CT technology.

BACKGROUND OF THE DISCLOSURE

Various X-ray baggage scanning systems are known for detecting the presence of explosives and other prohibited items in baggage or luggage prior to loading the baggage onto a commercial aircraft. Materials may be characterized by the spatial density distribution, and a common technique of measuring a material's density is to expose the material to X-rays and to measure the amount of radiation absorbed by the material, the absorption being indicative of the density.

A scanning system using computed tomography (CT) technology typically includes a CT scanner of the third generation type, which includes an X-ray source and an X-ray detector system secured to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include an array of detectors disposed as one or more rows in the shape of a circular arc having a center of curvature at the focal spot of the X-ray source, i.e., the point within the X-ray source from which the X-rays emanate. The X-ray source generates a fan-shaped beam, or fan beam, or cone beam of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is relatively thin in that direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors of the array for any measuring interval is referred to as a "projection," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from a point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well known algorithms, a three-dimensional (3D) CT image of the object may be generated from all the projection data collected at each of the projection angles. The CT image is representative of the density of the object. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner.

Baggage scanners using CT techniques have been proposed. One approach, described in U.S. Pat. No. 5,182,764 (Peschmann et al.) and U.S. Pat. No. 5,367,552 (Peschmann et al.) (hereinafter the '764 and '552 patents), has been commercially developed and is referred to hereinafter as the "In Vision Machine." The In Vision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

One important design criterion for a baggage scanner is the speed with which the scanner can scan an item of baggage. To be of practical utility in any major airport, a baggage scanner should be capable of scanning a large number of bags at a very fast rate. One problem with the In Vision Machine is that CT scanners of the type described in the '764 and '552 patents take a relatively long time, e.g., from about 0.6 to about 2.0 seconds, for one revolution of the disk to generate the data for a single sliced CT image. Further, the thinner the slice of the beam through the bag for each image, the better the resolution of the image. The CT scanner should provide images of sufficient resolution to detect plastic explosives on the order of only a few millimeters thick. Therefore, to provide adequate resolution, many revolutions are required. To meet high baggage throughput rates, a conventional CT baggage scanner such as the In Vision Machine can only afford to generate a few CT images per bag. Clearly, one cannot scan the entire bag within the time allotted for a reasonably fast throughput. Generating only a few CT images per item of baggage leaves most of the item unscanned and therefore does not provide scanning adequate to identify all potential threat objects in the bag, such as sheets of weapon material.

To improve throughput, the In Vision Machine uses a pre-screening process which produces a two-dimensional projection image of the entire bag from a single angle. Regions of the projection identified as potentially containing threat items can then be subjected to a full scan or manual inspection. With this pre-screening and selective region scanning approach, the entire bag is not scanned, thus allowing potential threat items to pass through undetected. This is especially true in the case of sheet items oriented transversely to the direction of propagation of the radiation used to form the pre-screen projection and where the sheet covers a relatively large portion of the area of the bag.

It would be beneficial for the baggage scanning equipment to automatically analyze the acquired density data and determine if the data indicate the presence of any contraband items, e.g., weapons. This automatic weapon detection process should have a relatively high detection rate such that the chances of missing a weapon in a bag are small. At the same time, the false alarm rate of the system should be relatively low to substantially reduce or eliminate false alarms on innocuous items. Because of practical considerations of baggage throughput at large commercial airports, a high false alarm rate could reduce system performance speed to a prohibitively low rate. Also, it would be beneficial to implement a system which could distinguish among the different types of weapons.

In the assignee's CT baggage scanning system as described and claimed in the U.S. patent applications listed above and incorporated herein by reference, threat items such as weapons are identified and classified in general by analyzing mass and/or density and/or shape of identified objects. Voxels in CT data for a piece of baggage are associated with density values. Voxels having density values within certain predetermined ranges of density can be identified and grouped together as objects. Using voxel volumes and densities, masses of identified objects are computed and are compared to mass thresholds. Analysis of this comparison and other predetermined parameters is used to determine whether the identified object can be classified as a threat object, i.e., a weapon.

In the assignee's system, a set of two-dimensional slices generated by the scanning system is automatically processed to locate threat objects. The processing generally includes three steps. First, each of the voxels is examined to determine if it could be part of a threat object. The main criterion used in making this determination is the density of the voxel. Next, a connected components labeling (CCL) approach is used to assemble the identified voxels into individual objects. Finally, discrimination is used to determine if each of identified object can be classified as a threat. The main criterion used in this discrimination step is the shape histogram, which is invariant to translation, rotation, mirror, and scale changes.

As with any other automatic identification system, false alarms on innocuous items can be generated. Also, because, like all systems, the assignee's system has an imperfect detection rate, some threat objects may not be detected, particularly where the threat objects are concealed in or near otherwise innocuous items.

SUMMARY OF THE DISCLOSURE

The present disclosure is directed to a method of and system for processing computed tomography (CT) data for a region to identify threat objects, such as guns, in the region. The region can include at least a portion of the inside of a container, such as a piece of baggage or luggage. The disclosed system and method are applicable to an automatic baggage scanning system which can automatically detect objects in the region and then discriminate objects to classify them as being threats or non-threats.

In accordance with the one embodiment of the disclosed method, a plurality of volume elements or voxels in the CT data for a region, each of which is associated with a density value, are identified. The region can include at least a portion of the inside of a container and/or a portion of the container itself. The container can be, for example, a piece of baggage or luggage. A plurality of object volume elements or voxels in the CT data associated with an object in the region is also identified. Eigen-values and eigen-vectors are computed from the coordinates of the object voxels, and the eigen-axis of the object corresponding to the smallest eigen-value is then identified. To aid in identifying the object, a two-dimensional (2D) eigen-projection of the object is generated in a plane perpendicular to the eigen-vector. In one embodiment, a contour of the object boundary from the 2D eigen-projection image is extracted. Other means for generating the projection image can also be used. For example, a plane of the two-dimensional projection is selected as the plane which contains the two-dimensional projection of the object with the largest area; or, a plane of the two-dimensional projection is selected according to the best representation of the object to be discriminating from others.

In accordance with one embodiment of the disclosed method, the extracted contour is an ordered set of points with each point represented by the two-dimensional coordinate system. These contour points are re-sampled in order to yield an equally-spaced contour, in which all the distances between any two consecutive points are the same. These contour points can also be directly used to compute a shape histogram without being sampled. Other sampling schemes can also be applied. For example, an unevenly sampling scheme can be used with the spacing proportional to the curvature of the contour.

In one embodiment, a shape histogram is computed from the equally-spaced sampled contour. The shape histogram is a histogram of the distance values of all the pairs of the contour points. The distance values are normalized by the mean of all the distance values. The distance values can also be normalized by the maximum of all the distance values. The distance is the square root of the sum of the squares of each coordinate difference between any two points. Other means of computing the distances can also be used, such as the sum of the absolute of each coordinate difference between any two points.

In one embodiment, as mentioned above, the shape histogram is generated using equal-size bins. Unequal-size bins can also be used to generate shape histogram. For example, exponentially increasing bin sizes can be used for generating the shape histogram.

In one embodiment, a difference measure between the extracted shape histogram and a set of stored pre-computed shape histograms is computed. The difference measure is the minimum of all the distances between the extracted shape histogram and any shape histogram in the set.

In an alternative embodiment, as mentioned above, the difference measure is computed using the square root of the sum of the square of the difference between two shape histograms. Other forms of the distances can also be used, such as the sum of the absolute of the difference between the two histograms, the maximum of the absolute of the difference between the two histograms.

In accordance with the teachings of the disclosure, the difference measure is compared with a pre-defined threshold. If the difference measure is less than the pre-defined threshold, a threat object such as a gun is declared to be found, otherwise, the object is declared as a non-threat object.

In one embodiment, pre-computed threat shape histograms are generated during a training procedure. A set of the threat objects is given during the training procedure. Each threat object is scanned multiple times at different orientations to generate the pre-computed threat shape histograms. Each threat object can also be scanned only once to generate the pre-computed threat shape histograms. A reduced set of the shape histograms can also be used as the pre-computed shape histograms. For example, each threat object in the given list is scanned once or multiple times, generating a set of shape histograms. A subset of the generated shape histograms can be used as the pre-computed shape histograms. Instead of simply selecting a subset of the generated shape histograms, a number of mean shape histograms can be used as the pre-computed shape histograms for later detection. Each mean shape histogram is the average of a subset of the generated shape histograms. Different criteria, such as the standard K-Nearest-Neighbor clustering algorithm, for choosing the subset of the generated shape histograms for computing the mean shape histograms can be used.

In one embodiment, a threshold is obtained during the training procedure to obtain the desired probability of detection and probability of false alarm, and this threshold is used later in detection. Other criteria for defining the threshold can also be used. For example, the threshold is chosen by only scanning the threat objects without scanning non-threat objects such that all the scanned threat objects are detected.

The disclosed threat detection method provides substantial improvement in automatic object identification, classification and/or discrimination in CT scanning systems. Particularly, the shape histogram of the eigen-projection representing the shape information of the object improves the discriminating capability of the system in addition to the use of mass and density features. By providing a method by which the shape information is represented in the form of shape histogram and used by the discrimination system, the overall detection rate of the system and overall false alarm rate of the system can be greatly improved.

BRIEF DESCRIPTION OF THE DRAWINGS

The foregoing and other objects of disclosed method and system, the various features thereof, as well as the invention itself may be more fully understood from the following description when read together with the accompanying drawings in which.

DETAILED DESCRIPTION OF THE DRAWINGS

The drawings are used to describe a system and a method which detects, identifies and/or classifies objects in CT data for a region. The region can include the interior of a piece of baggage or luggage, and/or a portion of the baggage or luggage itself being carried on and/or into a commercial aircraft or a building. The teachings provided in the disclosure can therefore be implemented in a CT baggage scanning system. The objects identified by the disclosed method and system can be objects known to pose threats to persons at an airport, a building, or on board an aircraft. These objects can include weapons such as guns. The disclosed method and system are specifically directed to an approach to using considerations of a shape histogram of a two-dimensional projection of a detected three-dimensional object in the determination as to whether a detected object poses a threat.

Throughout the following description, it is noted that many thresholds, such as density thresholds, mass thresholds, density-dependent mass thresholds, and difference thresholds as well as process parameters, can be (although not necessarily) used to carry out the various object identification and discrimination functions of the CT baggage scanning system to which the current teachings of the disclosure are applied. These thresholds and parameters are determined based on extensive analysis of CT data, such as actual three-dimensional CT density data, for many actual threat and non-threat objects. This analysis includes statistical analysis of the data employing statistical methods such as simulated annealing and genetic algorithms. In accordance with the disclose method, this analysis allows for threshold and/or parameter selection based on a particular objective to be met, e.g., false alarm and/or detection rate setting/optimization, discrimination of explosive type, etc.

Figure 1:
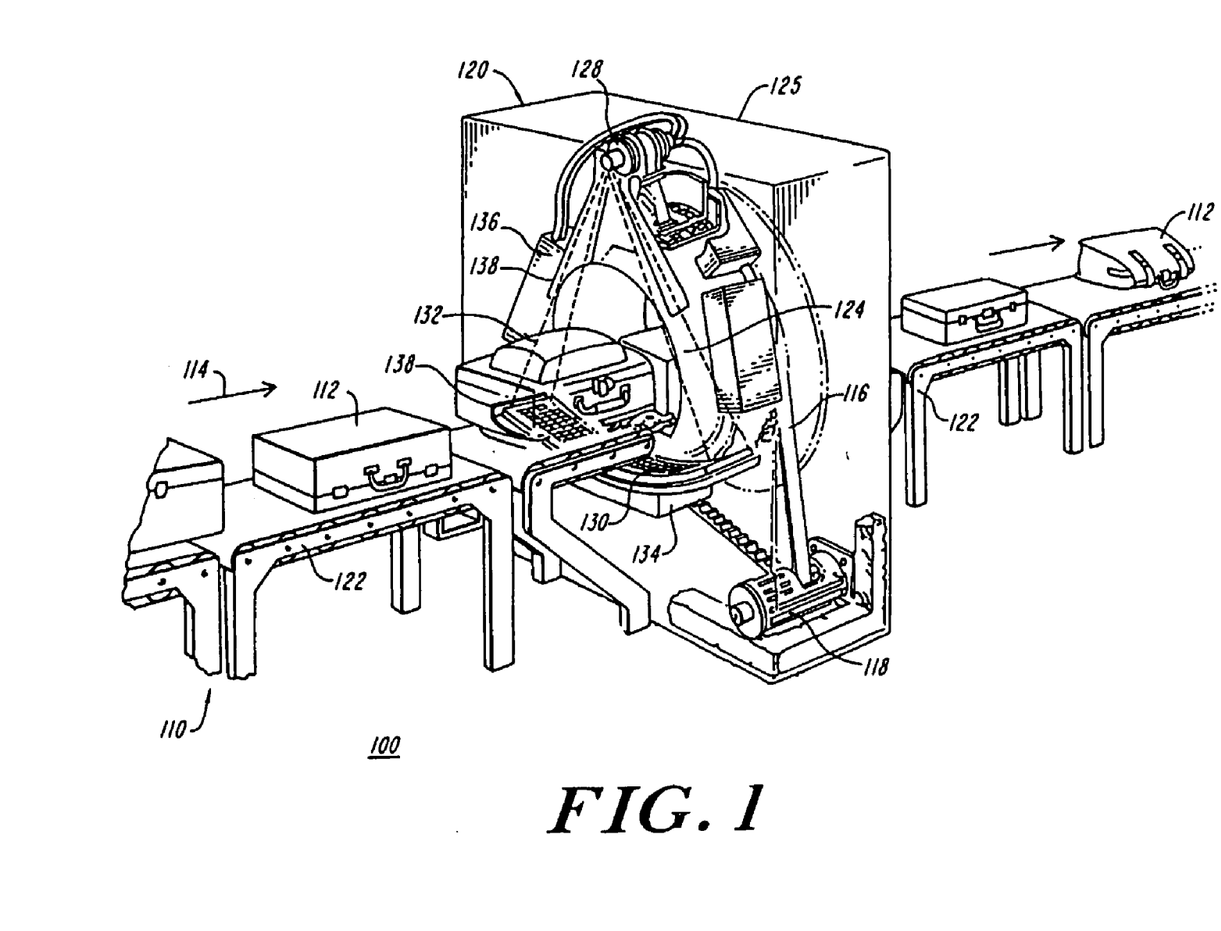
FIG. 1 contains a perspective view of a baggage scanning system of the type incorporating the disclosed method.
Figure 2:
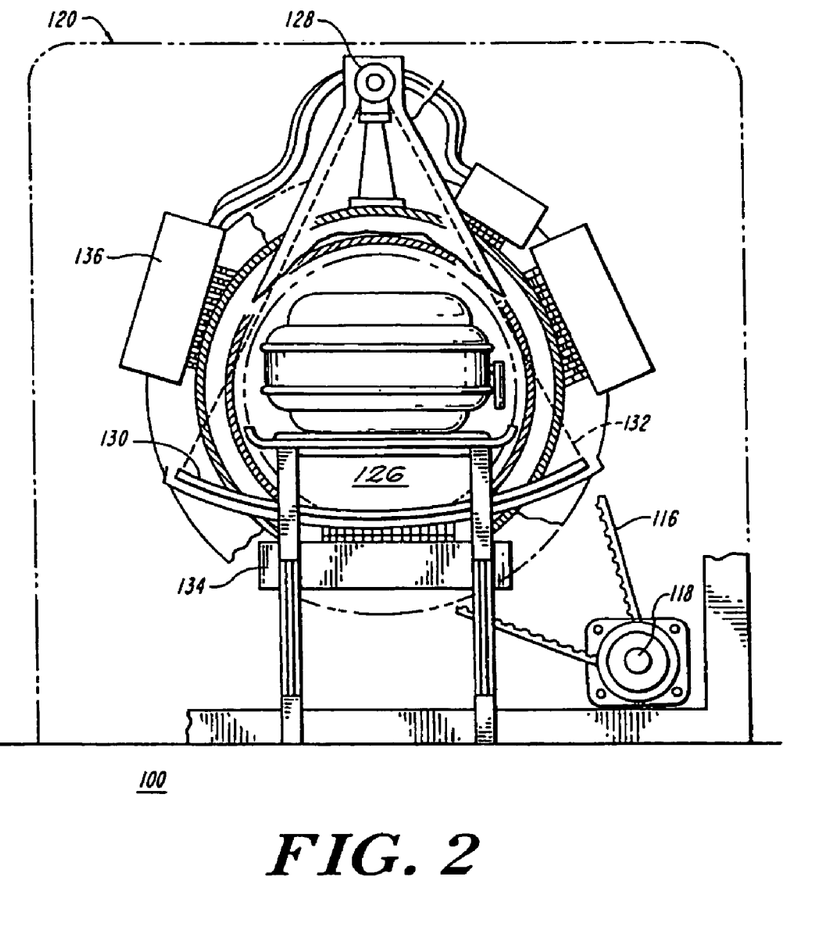
FIG. 2 contains a cross-sectional end view of the system shown in FIG. 1.
Figure 3:
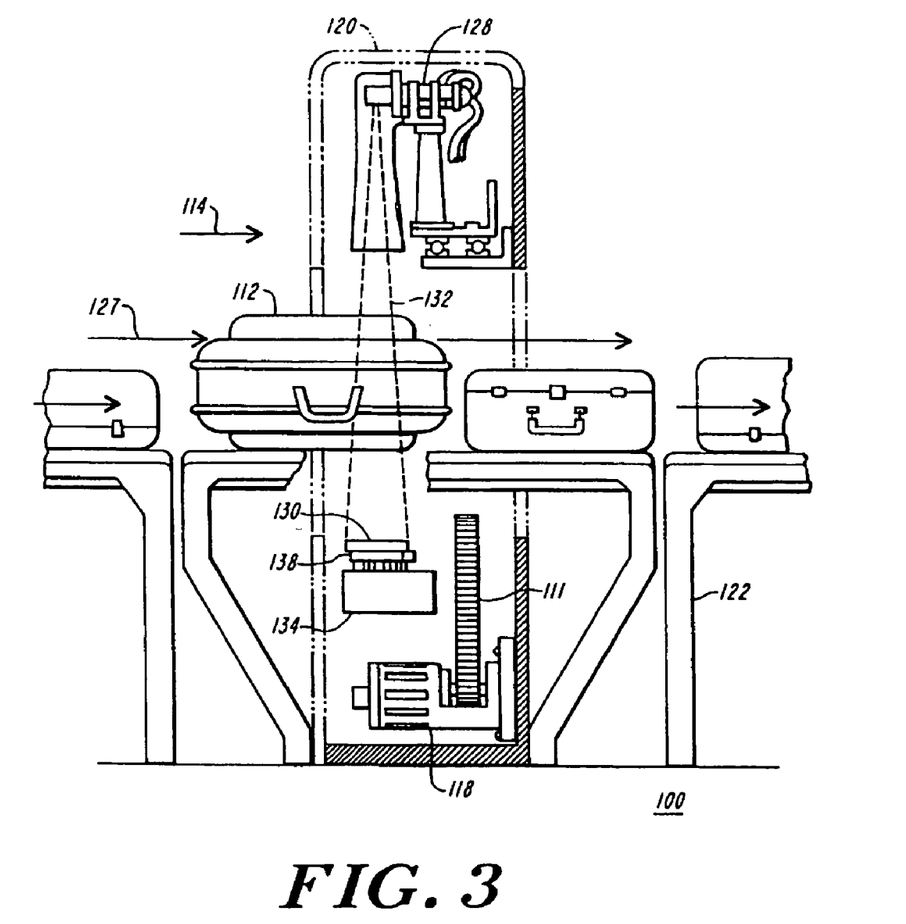
FIG. 3 contains a cross-sectional radial view of the system shown in FIG. 1.

FIGS. 1, 2 and 3 contain perspective, end cross-sectional and radial cross-sectional views, respectively, of a typical baggage scanning system 100 constructed to incorporated the disclosed system for carrying out the disclosed method. The system provides object detection, identification, classification and/or discrimination. The baggage scanning system 100 generates CT data for a region which can include a piece of baggage. The system can use the CT data to generate image volume elements or "voxels" for the region. The baggage scanning system can be of the type described in the U.S. patent applications listed above and incorporated herein by reference.

The system 100 includes a conveyor system 110 for continuously conveying baggage or luggage 112 in a direction indicated by arrow 114 through a central aperture of a CT scanning system 120. The conveyor system includes motor driven belts for supporting the baggage. Conveyor system 110 is illustrated as including a plurality of individual conveyor sections 122; however, other forms of conveyor systems may be used.

The CT scanning system 120 includes an annular shaped rotating platform or disk 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the assignee of the present application and which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 can be a two-dimensional array such as the array described in a U.S. Pat. No. 6,091,795, issued Jul. 18, 2000 to Schafer et al, entitled, "Area Detector Array for Computed Tomography Scanning System," assigned to the assignee of the present application and incorporated herein in its entirety by reference. The system 120 further includes a data acquisition system (DAS) 134 for receiving and processing CT data signals generated by detector array 130, and an X-ray tube control system 136 for supplying power to, and otherwise controlling the operation of, X-ray tube 128. The system 120 is also preferably provided with a computer processing system for processing the output of the data acquisition system 134 and for generating the necessary signals for operating and controlling the system 120. The computer system can also include a monitor for displaying information including generated images. The X-ray tube control system 136 can be a dual-energy X-ray tube control system such as the dual-energy X-ray tube control system described in U.S. Pat. No. 5,661,774, issued on Aug. 26, 1997, entitled, "Dual Energy Power Supply," which is assigned to the same assignee as the present application and which is incorporated herein in its entirety by reference. Dual energy X-ray techniques for energy-selective reconstruction of X-ray CT images are particularly useful in indicating a material's atomic number in addition to indicating the material's density, although as claimed it is not intended that the disclosed method and system be limited to this type of control system. It is noted that the detailed description herein of the object identification and classification system and method describes the details in connection with single-energy data. It will be understood that the description is applicable to multiple-energy techniques. System 120 also includes shields 138, which may be fabricated from lead, for example, for preventing radiation from propagating beyond gantry 125.

In one embodiment, the X-ray tube 128 generates a pyramidically shaped beam, often referred to as a "cone beam," 132 of X-rays that pass through a three-dimensional imaging field, through which baggage 112 is transported by conveying system 110. After passing through the baggage disposed in the imaging field, cone beam 132 is received by detector array 130 which in turn generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the baggage is continuously transported through central aperture 126 by conveyor system 110 so as to generate a plurality of projections at a corresponding plurality of projection angles.

In a well known manner, signals from the detector array 130 can be initially acquired by data acquisition system 134, and subsequently processed by a computerized processing system using CT scanning signal processing techniques. The processed data can be displayed on a monitor, and/or can also be further analyzed by the processing system as described in detail below to determine the presence of a suspected material. For example, the CT data can be analyzed to determine whether the data suggest the presence of material having the density (and when a dual energy system is used, molecular weight) of explosives. If such data are present, suitable means can be provided for indicating the detection of such material to the operator or monitor of the system, for example, by providing an indication on the screen of the monitor by sounding an audible or visual alarm, and/or by providing an automatic ejection device (not shown) for removing the suspect bag from the conveyor for further inspection, or by stopping the conveyor so that the suspect bag can be inspected and/or removed.

As stated above, detector array 130 can be a two-dimensional array of detectors capable of providing scan data in both the directions of the X- and Y-axes, as well as in the Z-axis direction. During each measuring interval, the plurality of detector rows of the array 130 generates data from a corresponding plurality of projections and thereby simultaneously scans a volumetric region of baggage 112. The dimension and number of the detector rows are preferably selected as a function of the desired resolution and throughput of the scanner, which in turn are a function of the rotation rate of rotating platform 124 and the speed of conveying system 110. These parameters are preferably selected so that in the time required for a single complete rotation of platform 124, conveying system 110 advances the baggage 112 just enough so that the volumetric region scanned by detector array 130 during one revolution of the platform is contiguous and non-overlapping with (or partially overlapping with) the volumetric region scanned by detector array 130 during the next revolution of the platform.

Conveying system 110 continuously transports a baggage item 112 through CT scanning system 120, preferably at constant speed, while platform 124 continuously rotates at a constant rotational rate around the baggage items as they pass through. In this manner, system 120 performs a helical volumetric CT scan of the entire baggage item. Baggage scanning assembly 100 preferably uses at least some of the data provided by the array 130 and a helical reconstruction algorithm to generate a volumetric CT representation of the entire baggage item as it passes through the system. In one embodiment, the system 100 performs a nutating slice reconstruction (NSR) on the data as described in U.S. Pat. No. 5,802,134, issued on Sep. 1, 1998, entitled, "Nutating Slice CT Image Reconstruction Apparatus and Method,". The system 100 thus provides a complete CT scan of each bag, rather than only providing CT scanning of selected portions of baggage items, without the need for a pre-screening device. The system 100 also provides rapid scanning since two-dimensional detector array 130 allows the system 100 to simultaneously scan a relatively large portion of each baggage item with each revolution of the platform 124.

Figure 4:
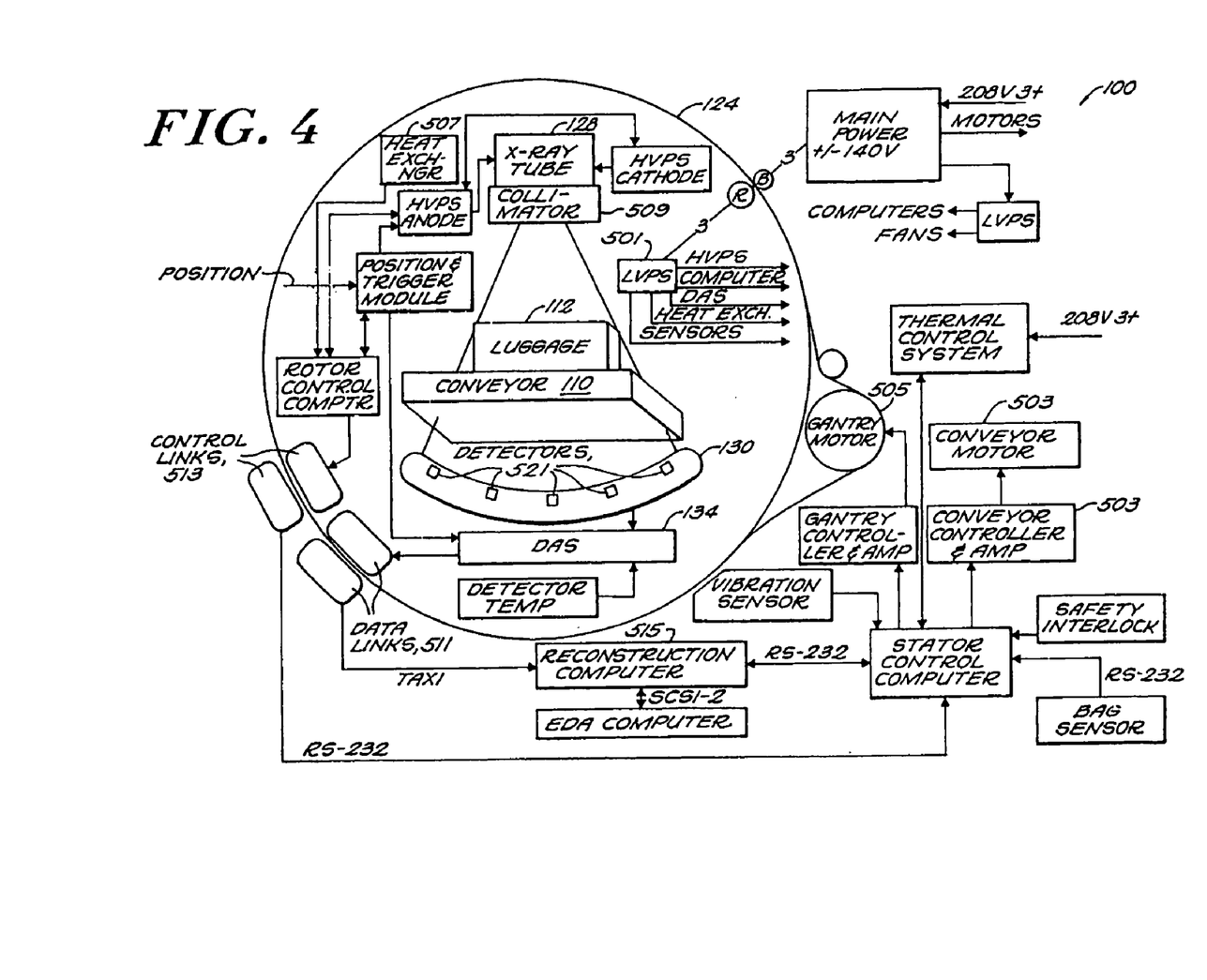
FIG. 4 contains a schematic electrical and mechanical block diagram of one embodiment of the baggage scanner shown in FIG. 1.

FIG. 4 contains a mechanical/electrical block diagram of one embodiment of the baggage scanning system 100 that can incorporate the disclosed system for carrying out the disclosed method. The mechanical gantry of the scanner 100 includes two major components, the disk 124 and the frame (not shown). The disk 124 is the rotational element which carries the X-ray assembly, the detector assembly 130, the data acquisition system (DAS) 134, a high-voltage power supply and portions of the monitor/control assembly, the power supply assembly and the data link assembly. The frame supports the entire system 100, including the baggage handling conveyor system 110. The disk 124 is mechanically connected to the frame, such as by a duplex angular contact ball bearing cartridge. The disk 124 can be rotated at a constant rate by a belt which can be driven by a DC servomotor 505. The gantry also contains X-ray shielding on the disk and frame assemblies.

In one embodiment, the baggage conveyor system 110 includes a single belt driven at a constant rate to meet specified throughput requirements. The belt can be driven by a high-torque, low-speed assembly to provide a constant speed under changing load conditions. A low-attenuation carbon graphite epoxy material can be used for the portion of the conveyor bed in the X-ray. The total length of the conveyor is designed to accommodate three average length bags. A tunnel is used around the conveyor to meet the appropriate safety requirements of a cabinet X-ray system.

In one embodiment, input power of 208 volts, 3-phase, 30 amps services as the main supply which can provide power for the entire system. This input power can be supplied by the airport at which the system is installed. Power is transferred from the frame through a series of frame brushes which make continuous contact with the metal rings mounted to the disk 124. The low-voltage power supply 501 on the disk 124 provides power for the DAS 134, the X-ray cooling system and the various monitor/control computers and electronics. A low-voltage power supply on the frame provides power for the reconstruction computer and the various monitor/control electronics. The conveyor motor 503, the gantry motor 505, the high-voltage power supply and the X-ray coolant pump can all be supplied power directly from the main supply.

The high-voltage power supply provides power to the X-ray tube 128. The supply can provide a dual voltage across the cathode/anode. The driving waveform can be any desirable shape, and preferably is in the form of a sine wave. This supply can also provide X-ray filament power. The supply current can be held approximately constant for both voltages.

The dual-energy X-rays strike the baggage, and some portion of the X-rays pass through and strike the detector assembly 130. The detector assembly 130 performs an analog conversion from X-ray to visible photons and then to electrical current. The DAS 134 can sample the detector currents, multiplex the amplified voltages to a set of 16-bit analog-to-digital converters and multiplex the digital outputs to the computerized processing system 515, which generates CT data and processes the data as described below to detect, identify and classify objects in the piece of baggage 112. In one embodiment, the digital data from the DAS 134 are transferred to the processing system 515 via a non-contact serial data link 511. The DAS 134 can be triggered by the angular position of the disk 124.

The non-contact links 511 and 513 can transfer the high-speed digital DAS data to the processing system 515 and the low-speed monitor/control signals back and forth between the disk and frame control computers. The data link 511 can be based upon an RF transmitters and receivers.

In one embodiment, the image reconstructor portion of the processing system 515 converts the digital line integrals from the DAS 134 into a set of two-dimensional images of bag slices for both the high and low energies. The CT reconstruction can be performed via a helical-cone-beam solution, such as the nutating slice reconstruction method described in U.S. Pat. No. 5,802,134, incorporated herein by reference. The reconstructor can include embedded software, a high-speed DAS port, an array processor, a DSP-based convolver, an ASIC-based backprojector, image memory, UART control port, and a SCSI output port for image data. The array processor can perform data corrections and interpolation. The reconstructor can be self-hosted and can tag images based upon the baggage information received over the UART interface to the frame computer.

The processing system 515 can include a PC-based embedded control system. All subsystems can be monitored for key health and status information. This system can also control both motion systems, can sense baggage information, can control the environment, e.g., temperature, humidity, etc., can sense angular position of the disk 124 and can trigger the DAS and HVPS. This system can also have a video and keyboard interface for engineering diagnostics and control. Additionally, a control panel can be included for field service.

The system thus described can be easily adapted, in accordance with the teachings provided herein, to detect other threat objects besides explosives. Most types of threat objects such as guns can be grouped into a number of categories which can be based upon their shapes and/or constituent materials. For example, categories can include guns, knives, and other categories based on shapes.

In general, such threat objects can be detected as follows:
identifying voxels corresponding to a potential threat object;
computing eigen-values and eigen-vectors of the potential threat object 3D voxel coordinates
generating the eigen-projection perpendicular to the eigen-vector corresponding to the smallest eigen-value from the voxels corresponding to the potential threat object;
obtaining the contour of the boundary of the potential threat object from the eigen-projection;
sampling the contour in an evenly spaced manner;
computing a shape histogram of the equally-spaced sampled contour;
computing a difference measure between the shape histogram and a set of pre-computed threat shape histograms; and,
declaring the potential threat object is a threat if said difference measure is less than a pre-defined threshold.

Figure 5:
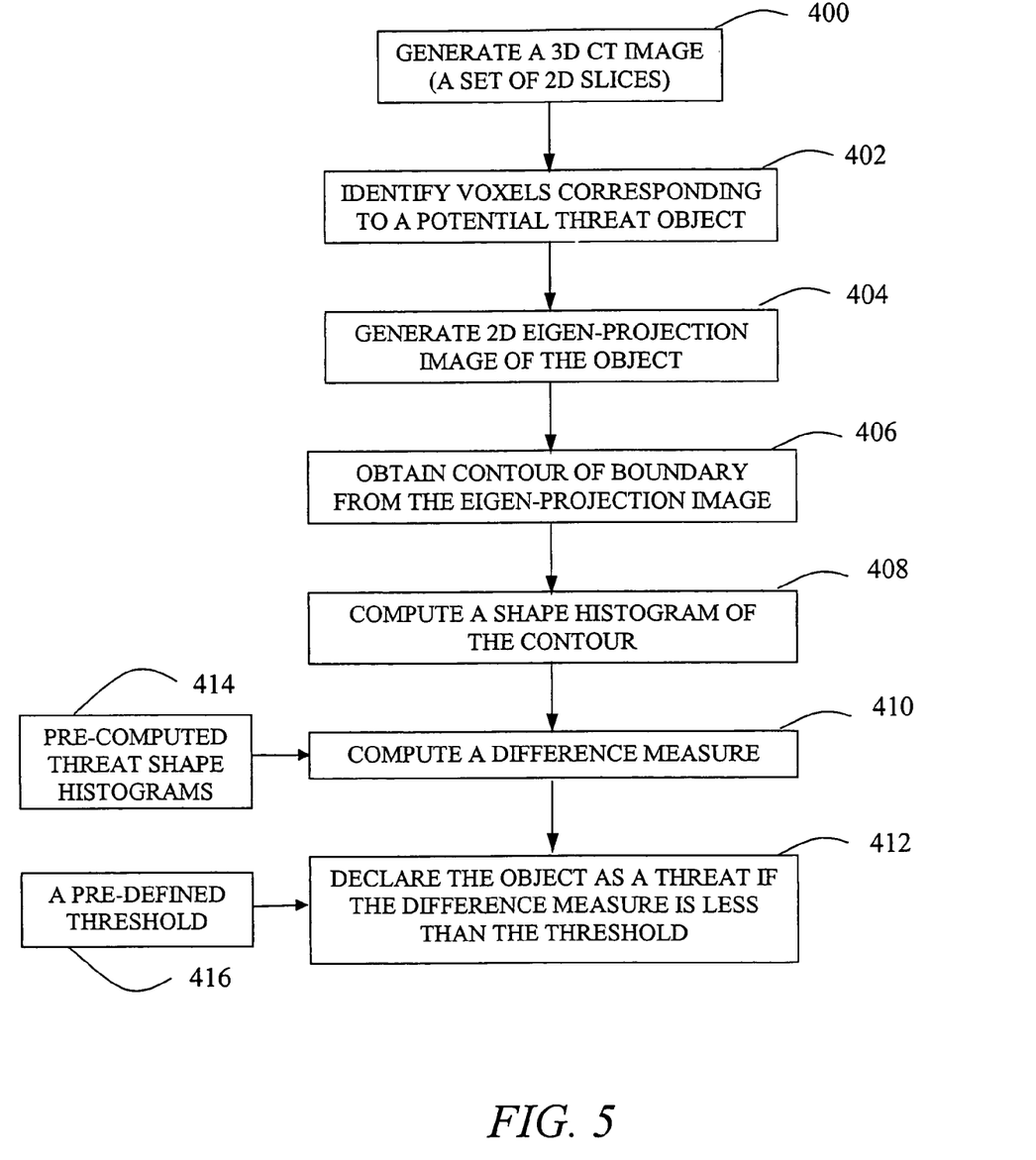
FIG. 5 contains a top-level flow diagram which illustrates the logical flow of one embodiment of the threat object detection method.

FIG. 5 contains a schematic flow diagram which illustrates the preferred embodiment of the logical flow of the process of detecting a threat object using the shape histogram of the contour of the 2D eigen-projection of the 3D segmented object.

In step 400, a 3D CT image is generated when a piece of luggage or baggage passes through the scanner as described previously. The 3D CT image contains a plurality of object volume elements or voxels, each of which has an associated CT number representing the density of the object.

Next, in step 402, the 3D morphological operation called erosion described in U.S. Pat. No. 6,075,871 (Simanovsky, et al.), and incorporated herein by reference, is preferably used to separate some thinly connected objects in the similar density range. The connected component labeling method is then applied to group the connected voxels with CT numbers no less than a predefined number, for example, 1300 Hounsfield Unit (HU), into objects. This results in a label image, and it should be noted that the label image can contain information about more than one object. To simplify the description, for purposes of exposition only, a single object will be referred to hereinafter. However, it will be understood that the description is applicable to data in which multiple objects are identified.

Figure 6:
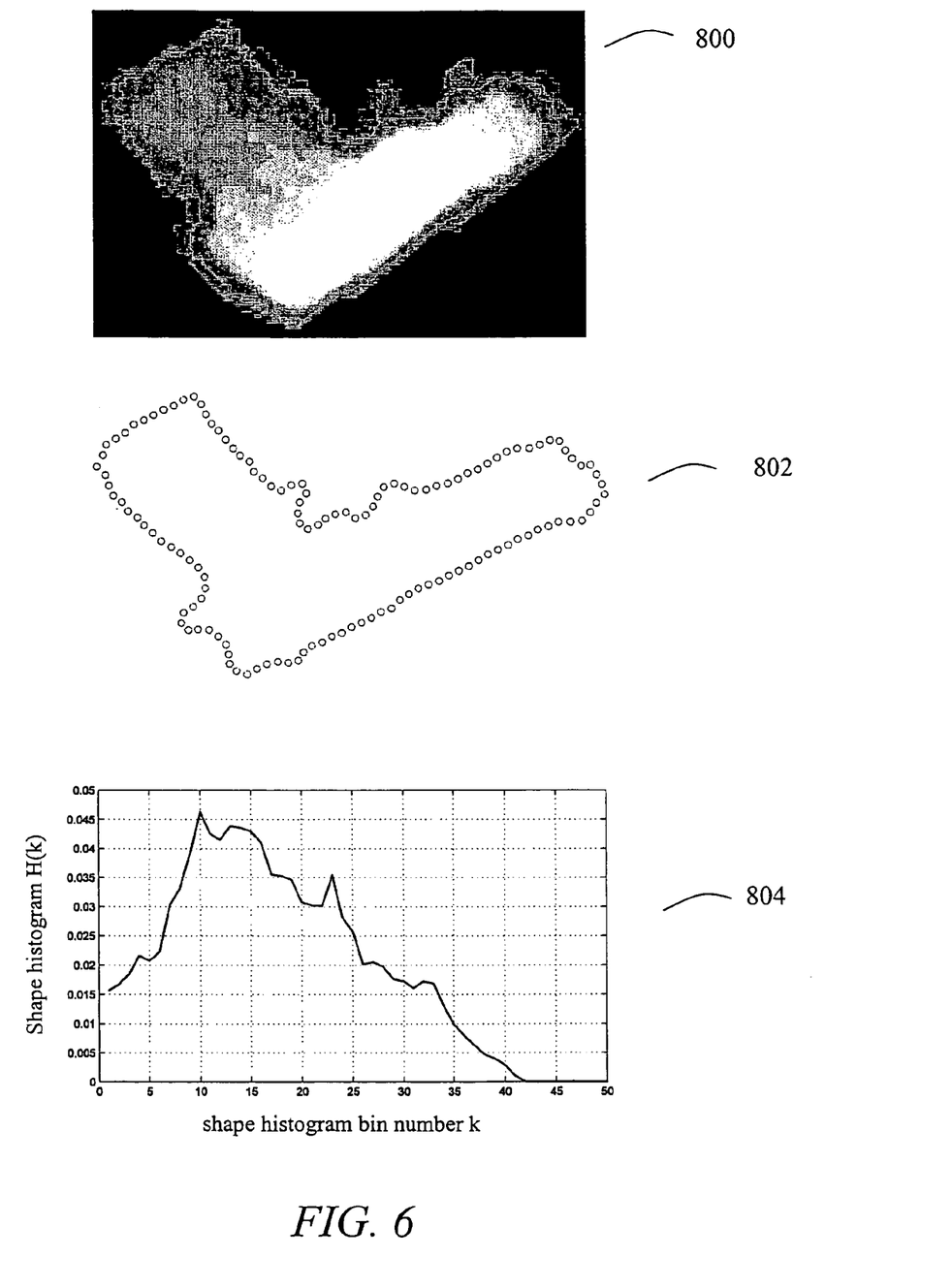
FIGS. 6A-6C contain an example eigen-projection of a gun, the corresponding extracted contour boundary, and the corresponding shape histogram, respectively.

Next, in step 404, preferably the eigen-projection image perpendicular to the eigen-vector corresponding to the smallest eigen-value from the voxels corresponding to the object is generated. The details of the description of generating eigen-projections are described in the same assignee's U.S. Pat. No. 6,345,113 B1 (Crawford et al.), incorporated herein by reference. This projection is referred to herein as the eigen-projection. The eigen-projection contains the shape information of the object. It should be noted that the projection need not be computed along the smallest eigen-vector. Information contained in projections along other two eigenvectors can also be used. An example of an eigen-projection image of a gun object is shown as item 800 in FIG. 6.

Next, in step 406, a boundary trace algorithm to extract the contour of the object from the projection image is applied. The boundary tracing algorithm uses an eight-neighbor scheme, and the details of the boundary tracing algorithm are described hereinafter. The extracted contour points are the ordered boundary points of a projected object, and are followed by an equally-spaced sampling step. The equally-spaced sampling is to re-sample the contour points so that the distances between any two consecutive points are approximately the same. The details of the equally-spaced sampling are also described later. An example of an extracted contour of a gun boundary in the eigen-projection is shown as item 802 in FIG. 6A.

Next, in step 408, a shape histogram is computed from the extracted contour. The shape histogram is a histogram of the normalized distances of all the pairs of the contour points. The information represented in the contour of the eigen-projection is transformed to the shape histogram. The shape histogram is invariant to the translation, rotation, mirroring, and scaling of the shape. An example of a shape histogram corresponding to an extracted contour of a gun boundary in the eigen-projection, based upon the image of the type shown in FIG. 6A, is shown as item 804 in FIG. 6B.

Next, in step 410, a difference measure between the shape histogram and a set of stored pre-computed threat shape histograms from item 414 is computed. The difference measure represents the similarity between the potential threat object and the set of the pre-defined threat objects. The smaller the difference measure is, the more similar the object is to the threat objects.

Last, in step 412, a gun object is detected if the difference measure is less than a pre-defined threshold from item 416.

An offline training procedure is required to generate the pre-computed threat shape histograms in item 414 and the threshold in item 416 before the actual detection. During the training procedure, a set of threat objects to be detected are given. Each of the threat objects is scanned a plurality of predetermined times at different orientations, with fifty scans being typical for each threat object. Various objects considered to be a non-threat are also scanned. 3D CT images corresponding to these threat and non-threat objects are obtained during the scanning. These 3D CT images are processed exactly the same as described from step 400 to step 408 to yield the shape histograms. The resulting shape histograms corresponding to the threat objects are equally split into two sets. The first set of the shape histograms are preferably stored in item 414 as the pre-computed threat shape histograms.

The second set of the threat shape histograms and the shape histograms corresponding to non-threat objects are preferably used to obtain the threshold in item 416. For each shape histogram, a difference measure is computed as described in step 410 with respect to the shape histograms stored in item 414.

The threshold is varied to obtain the different probability of detection and probability of false alarm. The probability of the detection is the ratio of the number of truly detected threat objects to the number of total scans of the threat objects. The probability of the false alarm is the ratio of the number of falsely detected threat objects to the number of the total scans of the non-threat objects. A threshold is chosen so that the desired probability of detection and probability of false alarm is achieved, for example, 90% probability of detection and 10% probability of false alarm. The threshold is then stored in item 416 for later detection.

The details of the boundary trace algorithm in accordance with the disclosed embodiment are described now. The eigen-projection image is used to extract the contour of the object boundary. Denote P[r,c] as the projection image with size of R×C, i.e. r=0, . . . , R−1, and c=0, . . . , C−1. Denote (R[i], C[i]) as the ith contour point, and i starting from zero. The first step is to locate (R[0], C[0]) by raster scanning the projection image until a non-zero pixel is found as described by the following pseudo C programming code,

```
for r=0 to R-1
    for c=0 to C-1
        if P[r,c] is greater than 0
            R[0]=r
            C[0]=c
            break both for loops
```

Figure 7:
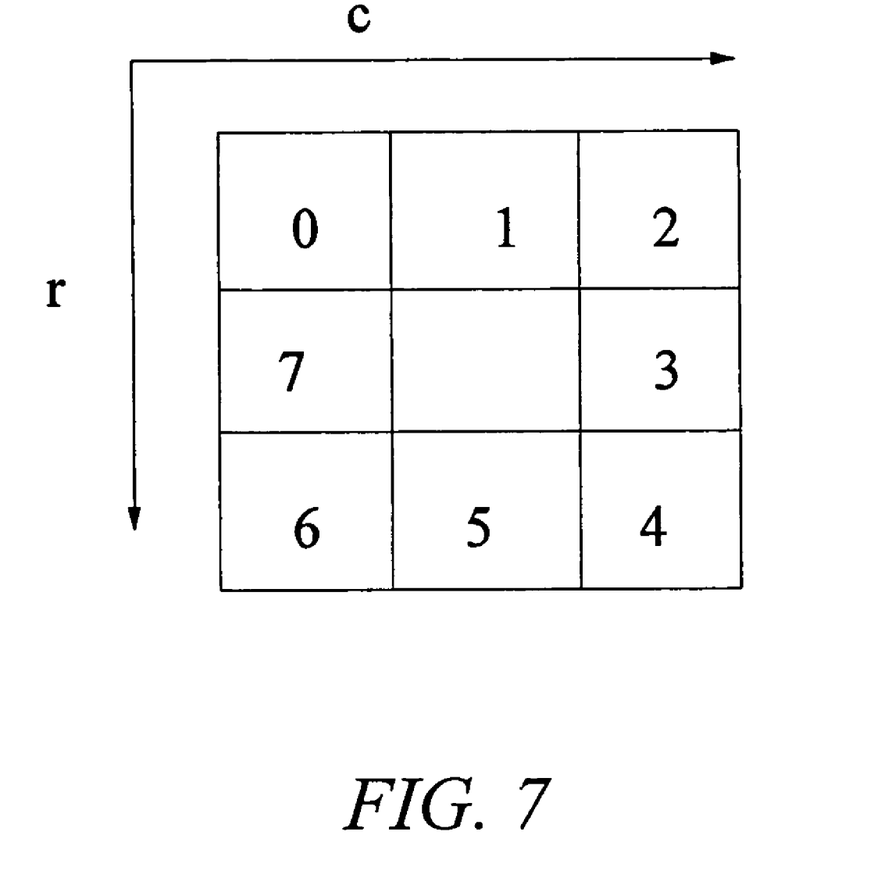
FIG. 7 illustrates the ordering of the eight neighbors for boundary tracing.

Then preferably the eight-neighbor scheme to trace the contour is used. An example of the order in accessing the eight neighbors with respect to the pixel being examined is shown in the example shown in FIG. 7. Note that the order of the eight neighbors determines whether the contour is extracted in clockwise or counter clock-wise direction. The second step is to find the second contour point (R[1], C[1]) by checking the eight neighbors of the first contour point (R[0], C[0]). The second point contour point is the first non-zero pixel of the eight neighbors of the first contour point (R[0], C[0]).

Given the first two contour points, the next contour point is searched starting from the first contour point centered at the second contour point using the eight-neighbor scheme. The third contour point is the first non-zero pixel of the eight neighbors of the second contour point. It starts the search among these eight neighbors of the second contour point from the first contour point, which is excluded, in the order of the example shown in FIG. 7. The tracing stops when the first contour point is met. A counter is used to count for the total number of contour points. The extracted ordered set of contour points are (R[j], C[j]), j=0, . . . , $N_c-1$, and $N_c$ is the number of contour points.

After the contour is extracted, an equally-spaced sampling of the contour is preferably performed. Denote $\vec{y}(j)=(R[i],C[i])$, i=0, . . . , $N_c-1$ as the extracted contour, and $\vec{y}(j)$ is two dimensional vector representing the row and column coordinates of the contour point.

First the accumulative distances P(i), i=0, . . . , $N_c-1$ are computed as follows, $$P(i+1) = P(i) + \sqrt{(R[i+1] - R[i])^2 + (C[i+1] - C[i])^2},$$
$$i = 0, \ldots, N_d - 1$$

where P(0)=0, and $y(N_c)=y(0)$. Note that $P(N_c)$ represents the total length of the contour. Given the desired number of points $N_d$ for the contour to be equally-spaced sampled, the distance step $\delta_c$ is computed as follows, $$\delta_c = \frac{P(N_c)}{N_d}$$

Note that the unit of distance step $\delta_c$ and accumulative distance P(i) is in millimeter.

Denote $\vec{x}(i)$, i=0, . . . , $N_d-1$ as the equally-spaced sampled contour, then is linearly interpolated from the original extracted contour as, $$\vec{x}(i) = w_i \vec{y}(k) + (1-w_i)\vec{y}(k+1), i=0, \ldots, N_d-1$$

where k satisfies the following condition, $$P(k) \leq i\delta_c \leq P(k+1)$$

and $$w_i = P(k+1) - i\delta_c$$

It was empirically determined that assigning a value of $N_d=128$ achieved satisfactory results, although other values can be used with varying results.

The details of computing the shape histogram in accordance with the preferred embodiment will now be described. The contour of the object boundary of the eigen-projection is represented by a set of ordered points, denoted by $\vec{x}(j)$, j=0, . . . , $N_d-1$ as follows, noting that $\vec{x}(j)=(R[j], C[j])$ is a two dimensional vector containing the coordinates of the contour point.

For all unique pairs of the contour points (i,j), i=0, . . . , $N_d-2$, j=i+1, . . . , $N_d-1$, compute the distance as follows, $$D(i,j) = \sqrt{(R[i]-R[j])^2 + (C[i]-C[j])^2}$$

There are total of $N_d(N_d-1)/2$ distance values. Normalize the distance by the mean distance value, $$D'(i, j) = \frac{D(i, j)}{D_{mean}}$$

where

-continued $$D_{mean} = \frac{2}{N_d(N_d-1)} \sum_{i=0}^{N_d-2} \sum_{j=i+1}^{N_d-1} D(i,j)$$

Compute the shape histogram of the normalized distances for k=0, ... $N_{h-1}$, $H_1(k)$=# of $D(i,j)$, such that $k\delta_h \leq D(i,j) < (k+1)\delta_h$, i=0, ..., $N_d$-2, j=i+1, ... $N_d$-1

$$H(k) = \frac{H_1(k)}{N_d(N_d-1)/2}$$

where $N_h$ is the number of the histogram bins, $\delta_h$ is the width of the histogram bins and is unit-less. The shape histogram describes the distribution of the normalized distance of a pair of contour points.

Each shape histogram describes a unique shape with the variation tolerated by the width of the histogram bins. The number of bins and the bin width are experimentally determined. The bin width is directly related to the tolerance of the shape distortion. Larger bin width results in less sensitive to the shape distortion and less discriminating in shapes. Thus tuning the width and the number of the bins makes it possible to generalize the gun shapes obtained from the training to the desired tolerance. Again based upon experience, setting $N_h$=50 and $\delta_h$=0.06 achieved satisfactory results, although other values can be used with varying results.

The details of computing the difference measure between the extracted shape histogram and a set of pre-computed threat shape histograms is described below. Given a set of $N_t$ threat shape histograms, and the difference measure is the minimum distance of the extracted shape histogram H to the $N_t$ pre-computed threat shape histograms, as, $$S(H) = \min_{i=0, ..., N_t-1} \sqrt{\sum_{j=0}^{N_h-1} (H[j] - H_i[j])^2}$$

The smaller S(H) is, the more similar the extracted shape is to a threat.

Preferably, the threshold obtained during the training procedure is denoted as described previously as $T_S$, the potential threat object is declared as a gun if the computed difference measure S(H) is less than the threshold $T_S$, and otherwise, the object is declared as non-threat object as, $$\text{Object} = \begin{cases} \text{Gun}, & \text{If } S(H) \leq T_S \\ \text{Not A Gun}, & \text{Otherwise} \end{cases}$$

While this invention has been particularly shown and described with references to preferred embodiments thereof, it will be understood by those skilled in the art that various changes in form and details may be made therein without departing from the spirit and scope of the invention as defined by the following claims. Such changes include not performing the erosion before the connected component labeling, not performing the equally-spaced sampling of the contour, and extending the type of threat objects from guns to other types of threat objects such as knives.

The invention claimed is:

1. A method of detecting threat objects represented in three-dimensional reconstructed computed tomography data, wherein said three-dimensional tomography data comprises a set of voxels, and wherein a set of pre-computed shape histograms of known threats and a pre-defined threshold are provided, the said method comprises the following steps:
   a. identifying voxels corresponding to a potential threat object;
   b. generating a projection from the said voxels corresponding to a potential threat object;
   c. obtaining the contour of the boundary of the said potential threat object from the said projection;
   d. computing a shape histogram of the said contour;
   e. computing the difference measure between the said shape histogram and the said set of pre-computed shape histograms; and
   f. declaring that said potential threat object is a threat if said difference measure is less than the said pre-defined threshold.

2. The method of claim 1 wherein said threat objects include guns.

3. The method of claim 1 wherein said threat objects include knives.

4. The method of claim 1 wherein said step of identifying voxels corresponding to a potential threat object includes a three-dimensional connected component labeling step.

5. The method of claim 1 wherein said step of identifying voxels corresponding to a potential threat object includes a three-dimensional erosion step.

6. The method of claim 1 wherein said projection in said step of generating a projection from the said voxels corresponding to a potential threat object is generated from an eigen-projection of the coordinates of the potential threat object.

7. The method of claim 1 wherein said step of obtaining the contour of the boundary of the said potential threat object from the said projection includes a re-sampling step.

8. The method of claim 1 wherein said shape histogram is normalized.

9. The method of claim 1 wherein said pre-computed shape histograms are generated by
   a. scanning a set of known threat objects
   b. generating a set of 3D CT images of the said known threat objects;
   c. processing each said 3D CT image with the following steps:
      i. identifying voxels corresponding to a threat object;
      ii. generating a projection from the said voxels corresponding to a threat object;
      iii. obtaining the contour of the boundary of the said threat object from the said projection;
      iv. computing a shape histogram of the said contour;
   d. storing all the computed shape histograms as said pre-computed threat shape histograms.

10. The method of claim 1 where said pre-defined threshold is generated by
   a. scanning a set of known threat objects and a set of non-threat objects
   b. generating a set of 3D CT images of the said known threat objects and a set of 3D CT images of the said non-threat objects;

c. processing each said 3D CT image with the following steps:
   i. identifying voxels corresponding to an object;
   ii. generating a projection from the said voxels corresponding to an object;
   iii. obtaining the contour of the boundary of the said object from the said projection;
   iv. computing a shape histogram of the said contour;
   v. computing the difference measure between the said shape histogram and the said set of pre-computed shape histograms;
d. varying the said threshold to yield different probability of detection and probability of false alarm; and,
e. choosing the said threshold such that the desired probability of detection and probability of false alarm are achieved.

11. The method of claim 6 wherein said eigen-projection is perpendicular to the eigen-vector corresponding to the smallest eigen-value.

12. The method of claim 8 wherein said normalization uses the mean of all the distances.

13. The method of claim 7 wherein said re-sampling step includes an equally-spaced sampling scheme.

14. The method of claim 8 wherein said normalization uses the maximum of all the distances.

15. A system for detecting threat objects represented in three-dimensional reconstructed computed tomography data, wherein said three-dimensional tomography data comprises a set of voxels, and wherein a set of pre-computed shape histograms of known threats and a pre-defined threshold are provided comprising:
   a. a voxel identification subsystem constructed and arranges so as to identify voxels corresponding to a potential threat object;
   b. a projection generator constructed and arranged so as to generate a projection from the said voxels corresponding to a potential threat object;
   c. a contour boundary determinator constructed and arranged so as to obtain the contour of the boundary of the potential threat object from the the projection;
   d. a histogram determinator constructed and arranged so as to compute a shape histogram of the said contour;
   e. a difference deteminator constructed and arranged so as to compute the difference measure between the said shape histogram and the said set of pre-computed shape histograms; and
   f. a potential threat notifier constructed and arranged so as to declare that said potential threat object is a threat if said difference measure is less than the said pre-defined threshold.

16. The system of claim 15, wherein said threat objects include guns.

17. The system of claim 15, wherein said threat objects include knives.

* * * * *